(12) United States Patent
Ehrbar

(10) Patent No.: US 10,399,721 B2
(45) Date of Patent: Sep. 3, 2019

(54) DOSAGE-DISPENSING DEVICE FOR SUBSTANCES IN POWDER FORM

(71) Applicant: Mettler-Toledo GmbH, Greifensee (CH)

(72) Inventor: Sandra Ehrbar, Volketswil (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 15/847,209

(22) Filed: Dec. 19, 2017

(65) Prior Publication Data

US 2018/0178937 A1 Jun. 28, 2018

(30) Foreign Application Priority Data

Dec. 22, 2016 (EP) ..................................... 16206342

(51) Int. Cl.
*B65B 39/00* (2006.01)
*G01F 13/00* (2006.01)

(52) U.S. Cl.
CPC .......... *B65B 39/004* (2013.01); *G01F 13/001* (2013.01)

(58) Field of Classification Search
CPC ........................... B65B 39/004; G01F 13/001
USPC ........................................ 222/342, 504, 549
See application file for complete search history.

(56) References Cited

U.S. PATENT DOCUMENTS

| | | | |
|---|---|---|---|
| 4,084,726 A | 4/1978 | Nicol | |
| 4,905,525 A | 3/1990 | Kurfurst | |
| 5,145,009 A | 9/1992 | Mheidle et al. | |
| 7,770,761 B2 | 8/2010 | Lüchinger et al. | |
| 7,922,043 B2 | 4/2011 | Luechinger | |
| 7,922,044 B2 | 4/2011 | Lüchinger | |
| 8,141,751 B2 | 3/2012 | Luechinger et al. | |

(Continued)

FOREIGN PATENT DOCUMENTS

DE 198 41 478 A1 3/1999
GB 1258931 12/1971

*Primary Examiner* — Donnell A Long
(74) *Attorney, Agent, or Firm* — Standley Law Group LLP; Jeffrey S. Standley; Stephen L. Grant

(57) ABSTRACT

A device dispenses dosages of a substance in powder- or paste form contained in a supply container, when a head (1) of the device is connected to the supply container. The head has a housing with an outlet opening (107) of circular cross-section and a delivery- and closure element (100). The outlet opening and the delivery- and closure element are arranged on a central lengthwise axis (15) of the head. The delivery- and closure element rotates relative to the housing about this axis and is arranged for translatory displacement relative to the housing along the axis. The delivery- and closure element is cylindrical in its fundamental contour shape. A closure portion (101) thereof closes off the outlet opening. A delivery portion (102) is adjacent to the closure portion and delivers substance that is to be dispensed. A shaft portion is adjacent to the delivery portion. A conveyor body (103) on the delivery portion conveys substance to the outlet opening. In an operative state, the closure portion is arranged below the delivery portion, providing an end surface at a bottom end of the delivery- and closure element. A recess from the shell surface of the basically cylindrical contour shape of the delivery- and closure element extends over the delivery portion and the conveyor body, forming a smoothly shaped delivery surface (104).

19 Claims, 2 Drawing Sheets

(56) References Cited

U.S. PATENT DOCUMENTS

| | | | |
|---|---|---|---|
| 2008/0185401 A1* | 8/2008 | Luchinger | G01F 13/001 222/344 |
| 2008/0283555 A1* | 11/2008 | Luechinger | B65B 39/004 222/235 |
| 2016/0221700 A1* | 8/2016 | Heuser | B65B 39/004 |
| 2017/0267386 A1 | 9/2017 | Meleg et al. | |

* cited by examiner

Fig. 1 *(Prior Art)*
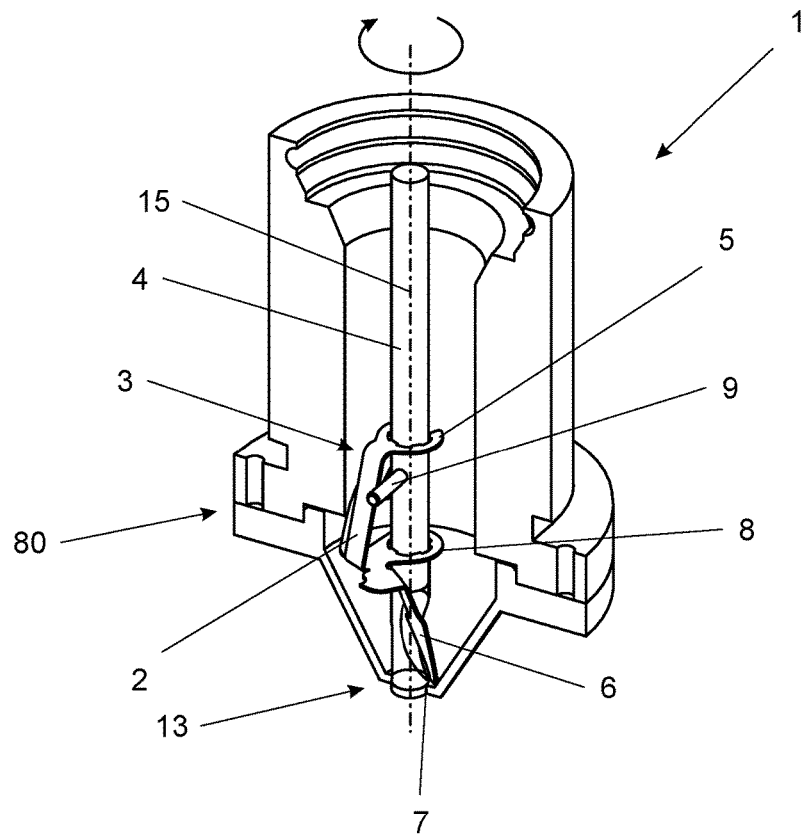
Fig. 2a Fig. 2b Fig. 2c Fig. 2d
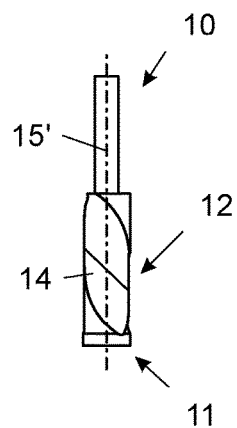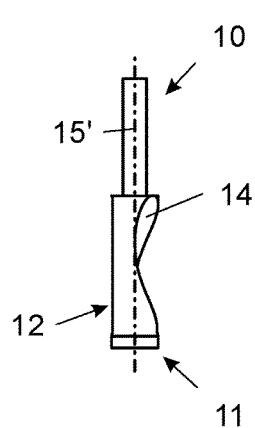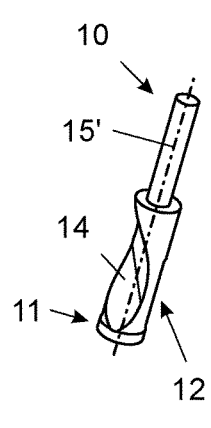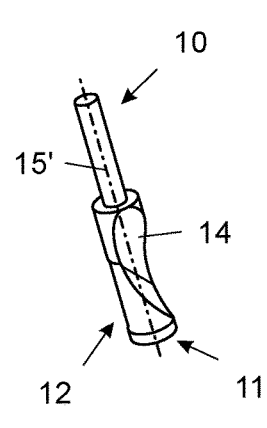
*(Prior Art)*

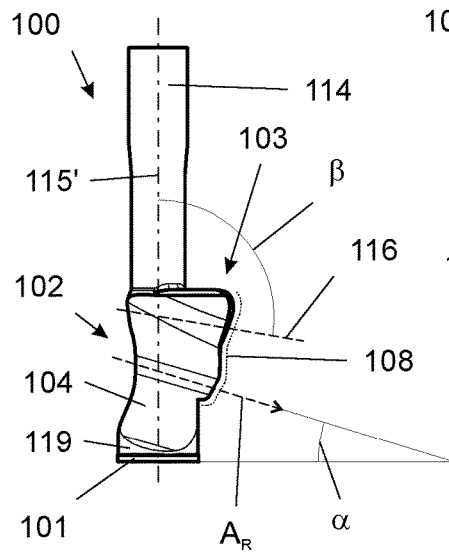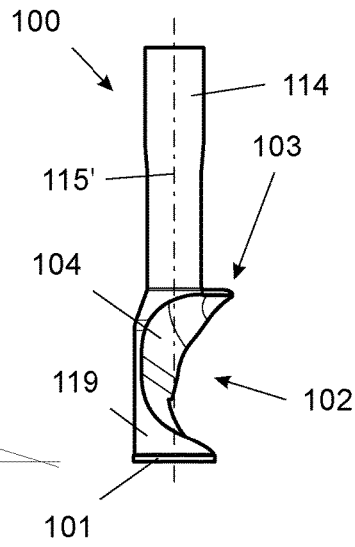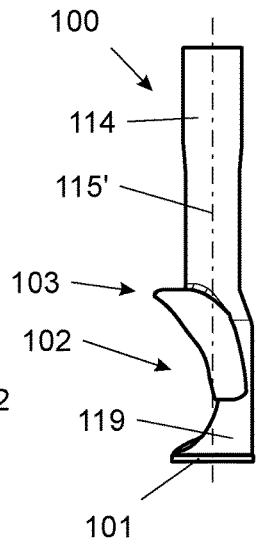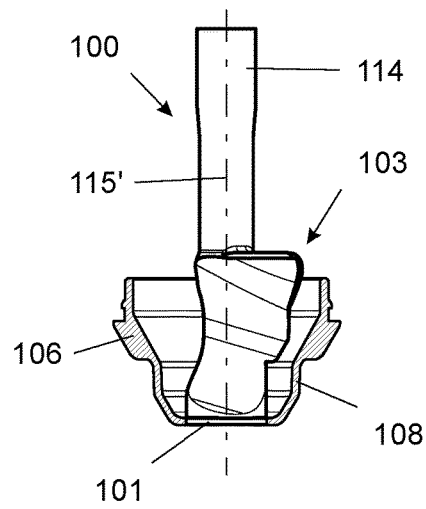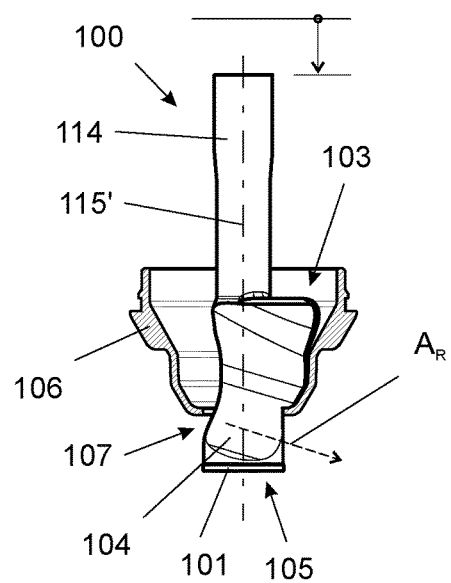

DOSAGE-DISPENSING DEVICE FOR SUBSTANCES IN POWDER FORM

CROSS-REFERENCE TO RELATED APPLICATIONS

This application claims priority to EP 16206342.4, filed 22 Dec. 2016, the content of which is incorporated by reference as if fully recited herein.

TECHNICAL FIELD

The disclosed embodiments concern a dosage-dispensing device for substances in powder- or paste form, which includes a dosage-dispensing head that can be connected or is connected to a supply container.

BACKGROUND

Dosage-dispensing devices find application in particular in dispensing small quantities, for example of toxic substances, with high precision into small target containers. Frequently, such recipient containers are placed on a balance in order to weigh the substance delivered out of the dosage-dispensing device, so that the substance can subsequently be further processed according to given specifications.

The substance to be dispensed is contained for example in a source container which has a connection to the dispensing head and, to perform the dispensing function, forms a unit with the dispensing head, said unit being referred to as the dosage-dispensing device. It is desirable to deliver the substance to the outside through a small outlet opening of the dosage-dispensing device, so that the substance can be filled in a targeted stream also into a container with an opening of narrow cross-section.

Dosage-dispensing devices for dry and/or powdery substances of a pourable consistency belong to the known state of the art and are in current use. For example in U.S. Pat. No. 5,145,009 A, a device for dispensing measured doses is described which consists of a dispensing container with a closable outlet at its underside. As a closure device for the outlet, a cone-shaped valve body is used whose diameter decreases in the upward direction, which can be moved vertically downward in order to open an outlet opening. This valve body rotates when it is in its open position and is equipped with means to move the substance in the direction of the outlet opening.

The device of the foregoing description is not well suited for dispensing substances into containers with an opening of narrow cross-section. The upward-narrowing shape of the valve body as well as the rotary movement of the latter impart a radial, horizontal velocity component to the particles of the outflowing material leaving the outlet opening and therefore cause a dispersion of the material stream which can spread beyond even a relatively large-diameter opening of a recipient container that is to be filled.

A method and a device for the delivery of an extremely small sample of a substance in powder- or paste form, for example for atomic absorption spectroscopy, is disclosed in U.S. Pat. No. 4,905,525 A. In a reservoir container with an outlet opening at the end of a tubular channel, a tamping piston reaches from above into the sample material inside the container. By pushing the tamping piston into the sample material so that the latter is compacted in the area above the tubular channel, a small quantity is pressed through the tubular channel and discharged from the outlet opening. In a special embodiment, the container is configured in the shape of a funnel towards the outlet opening, and the tamping piston is arranged at an oblique angle to the outlet opening.

In DE 198 41 478 A1, a dosage-dispensing device is described which serves to fill packages of viscous, pasty, powdery or granular products, with a dosage-dispensing container whose profile, in the operating position of the dosage-dispensing device, narrows down towards the bottom end, where an outlet opening is arranged. A hollow shaft arranged at the center carries scraping tools. The dosage-dispensing device is equipped with a dispensing valve which includes a valve rod that is arranged in the hollow shaft and is movable up and down inside the latter in translatory motion. At the bottom end of the valve rod, a valve head is arranged which is conically tapered, its width decreasing in the upward direction, so that the fill quantity of material delivered into the package can be regulated and the outlet opening can be closed from above. In some of the aforedescribed embodiments, the dispensing valve is also designed to be rotatable.

In a dosage-dispensing device according to DE 198 41 478 A1 or according to U.S. Pat. No. 5,145,009 A, the dosage quantity to be dispensed from the container cannot be arbitrarily small. Since the outlet opening is ring-shaped, the minimum width of the ring gap needed to dispense a substance must be at least equal to the dimension of a smallest material unit of the substance—for example a powder particle—and furthermore, several substance units can pass through the ring gap simultaneously. There is also the risk that, depending on the properties of the substance, part of the gap can become clogged. This can occur particularly towards the end of a dosage-dispensing process, when the outflow rate is to be slowed down by reducing the width of the ring gap, because the ratio between the width and the length of the gap becomes more and more unfavorable.

In EP 1 931 950 B1, a dosage-dispensing device with a delivery- and closure element is shown, wherein the aforementioned drawbacks have been overcome so that measured doses of minute quantities of powdery or pasty substances can be dispensed into a container. In addition, a conveyor tool is proposed in EP 1 931 952 B1 which is supported and guided with translatory mobility relative to the delivery- and closure element along the central longitudinal axis of the latter, so that in the operating state of the dosage-dispensing device, the conveyor tool is always in loose contact with the rim of the housing that surrounds the outlet opening. The purpose is to ensure that even when the passage opening is reduced to a minimum, there is always enough of the dosage material being brought to the passage opening. The aim is to make it possible, through the combined action of the conveyor tool and the delivery- and closure element, to dispense measured doses of powders that have a strong tendency to coagulate, or powders with charged particles, or pastes, through an arrangement in which these substances are loosened up, conveyed to the passage opening in a controlled manner, and wiped away from the rim of the outlet opening.

A dosage-dispensing device with a delivery- and closure element in accordance with EP 1 931 950 B1 and EP 1 931 952 B1 was found to be at a disadvantage if the objective is to dispense larger fill quantities with a consistent degree of accuracy, because the discharge rate is limited by the cross-sectional area of the delivery- and closure element. Attempting to simply increase the cross-section of the delivery- and closure element can have the result, that the powdery- or pasty substance is not being moved at a sufficient feed rate.

This has a negative effect on a steady fill rate or on the ability to meet the accuracy tolerance for the targeted fill quantity.

SUMMARY

It is therefore the object of the present invention to provide a delivery- and closure element whereby larger quantities of powdery or pasty substances can be filled at a faster rate into a container in a targeted stream and with a degree of accuracy that meets the tolerance for the targeted fill quantity. A further objective is to provide the capability that pastes or substances with a strong tendency to coagulate can be dispensed by the dosage-dispensing device.

This task is solved by a dosage-dispensing device for substances in powder- or paste form with a supply container and with a dosage-dispensing head that is connected or connectable to the supply container, wherein the dosage-dispensing head includes a housing with an outlet opening of circular cross-section and a delivery- and closure element. The outlet opening and the delivery- and closure element are arranged on a central lengthwise axis of the dosage-dispensing head, wherein the delivery- and closure element is designed to be rotatable relative to the housing about the central lengthwise axis of the dosage-dispensing head and to be capable of translatory displacement relative to the housing along the central lengthwise axis of the dosage-dispensing head. The delivery- and closure element is cylindrical in its fundamental contour shape and includes: a closure portion serving to close off the outlet opening; a delivery portion arranged adjacent to the closure portion and serving to deliver substance that is to be dispensed; a shaft portion arranged adjacent to the delivery portion; and a conveyor body formed on the delivery portion and serving to convey substance to the outlet opening. In in the operative state of the dosage-dispensing device, the closure portion is located below the delivery portion and forms an end surface at the bottom end of the delivery- and closure element. The delivery portion has a recess from the shell surface of the basically cylindrical contour shape of the delivery- and closure element.

According to the invention, the recess extends over the delivery portion and the conveyor body that is formed on the delivery portion, wherein the recess forms a smoothly shaped delivery surface.

The conveyor body which is formed directly on the delivery portion and forms a smoothly shaped delivery surface with the recess, improves the delivery of larger quantities of powdery or pasty substances by providing an uninterrupted flow through the dosage-dispensing head into a container set up below, with minimal resistance to the substance moving out of the source container. This allows a container to be filled faster, in a targeted stream, and with a degree of accuracy that meets the tolerance for the targeted fill quantity.

In an advantageous embodiment, the delivery surface forms a part of a shell surface of a recess with a basically cylindrical contour shape, wherein the central lengthwise axis of said basically cylindrical contour shape defines the discharge direction in which the substances in powder- or paste form exit from of the delivery- and closure element when substance is being dispensed during operation, and wherein the conveyor body is arranged in the discharge direction from the central lengthwise axis of the delivery- and closure element, or alternatively the conveyor body is arranged in the opposite sense of the discharge direction, extending to the opposite side from the central lengthwise axis of the delivery- and closure element.

Advantageously, the discharge direction and the end surface of the delivery- and closure element enclose an acute angle $\alpha$ that is larger than 0° and up to 45°. A further improvement in the delivery is obtained if the acute angle $\alpha$ lies in a range between 15° and 25°.

Advantageously, the delivery surface is shaped with a concave curvature. Furthermore, the delivery surface can advantageously be concave-curved in two directions, wherein in the second direction a second recess forms a part of a shell surface of a second basically cylindrical contour shape, and wherein the central lengthwise axis of the second basically cylindrical contour shape and the central lengthwise axis of the delivery- and closure element enclose an obtuse angle $\beta$ between each other. The obtuse angle $\beta$ can lie in a range between 90° and 135°. The concave curvature of the delivery surface in two directions makes an additional significant improvement in the delivery of larger quantities of powdery or pasty substances.

A cylinder is a body that is delimited by a cylinder surface (shell surface) with a closed generating curve and by two parallel planes, the base surfaces of the cylinder. As mentioned above, the recesses in the delivery- and closure element have a basically cylindrical contour shape. At the intersection of these basically cylindrical contour shapes with the delivery portion, the material of the delivery- and closure element is removed. The spatial relationship between the basically cylindrical contour shapes and the delivery-closure element is defined by the two angles $\alpha$ and $\beta$.

In a further embodiment, the integrally incorporated conveyor body in its installed condition in a dosage-dispensing head is arranged, relative to the movement direction of the powdery or pasty substance, upstream of the outlet opening of a funnel element of the dosage-dispensing head.

For an improved flow of the delivery, the integrally incorporated conveyor body has a border contour which follows the internal contour of the funnel element. Furthermore, in the operating state of the dosage-dispensing device with the delivery- and closure element completely extended, the integrally incorporated conveyor body can essentially always be in loose contact with the internal contour of the funnel element or, in the operating state of the dosage-dispensing device with the delivery- and closure element completely extended, the integrally incorporated conveyor body along its border contour is spaced apart from the internal contour of the funnel element by an interstitial gap. Depending on the substance to be dispensed (viscous, pasty, powdery or granular) one of the foregoing variants has the advantage over the others in regard to the improvement in the delivery flow of larger quantities of substance.

In a further developed embodiment, the internal contour of the funnel element is configured in the shape of a funnel with an intermediate cylindrical section. This improves the flow of substance to be delivered.

In another further developed embodiment, the shaft portion has a smaller diameter than the delivery portion, and the delivery portion has a smaller diameter than the closure element.

Advantageously, the integrally formed conveyor body is configured as a scraper. As a result of the rotation of the delivery and closure element, the conveyor body moves the substance to the outlet opening and thereby improves the delivery rate for larger quantities of the substance that is being delivered.

BRIEF DESCRIPTION OF THE DRAWINGS

In the following, the subject of the invention is explained through the description of preferred embodiments which are shown in the attached drawings, wherein:

FIG. 1 shows a state-of-the-art dosage-dispensing head with conveyor tool;

FIG. 2a shows the state-of-the-art delivery- and closure element of FIG. 1, seen from the side with the view directed at the delivery surface;

FIG. 2b shows the state-of-the-art delivery- and closure element of FIG. 2a, turned 90° from the orientation shown in FIG. 2a;

FIG. 2c shows the state-of-the-art delivery- and closure element of FIG. 2a in a three-dimensional representation;

FIG. 2d shows the state-of-the-art delivery- and closure element of FIG. 2a in another three-dimensional representation;

FIG. 3a shows the delivery- and closure element according to the invention, seen from the side with the view directed at the delivery surface;

FIG. 3b shows the delivery- and closure element of FIG. 3a, turned −90° from the orientation shown in FIG. 3a;

FIG. 3c shows the delivery- and closure element of FIG. 3a, turned 90° from the orientation shown in FIG. 3a;

FIG. 4a illustrates the delivery- and closure element of FIG. 3a, shown in its relationship to a funnel element of the dosage-dispensing head, in the closed operating position; and FIG. 4b illustrates the delivery- and closure element of FIG. 3a, shown in its relationship to a funnel element of the dosage-dispensing head, in the completely open operating position.

In the following description, features that have the same function and a similar configuration are identified by the same reference symbols.

DETAILED DESCRIPTION OF THE PREFERRED EMBODIMENTS

In cases where powdery substances with poor flow properties are being dispensed, i.e. for example sticky powders, or to dispense substances in the form of pastes, it is of considerable advantage if a conveyor tool 3 is used. In one embodiment of the prior art which is illustrated in FIG. 1, a conveyor tool 3 is arranged inside a housing 80 of a dosage-dispensing head 1. This conveyor tool 3 includes a holder device which holds the rod 4 with a ring-like embrace at two locations vertically above each other, whereby the conveyor tool 3 is loosely connected to the rod 4. The conveyor tool 3 further includes a stirrer portion 2 and a conveyor element 6 in the shape of a scraper or shovel. An upper holder ring 5 of the holder device of the conveyor tool 3 is arranged above a cross pin 9 which is solidly connected to the rod 4, and a lower holder ring 8 is arranged below the cross pin 9. This arrangement defines the degree of mobility of the conveyor tool 3 within the dosage-dispensing device. When the rod 4 is raised or lowered in a translatory movement along the central longitudinal axis 15 in order to open or close the outlet opening 7, the movable attachment of the conveyor tool 3 to the rod 4 ensures (in this case through the action of gravity) that the conveyor tool 3 always remains in loose contact with the rim 13 of the outlet opening 7. Furthermore, when the rod 4 rotates, the cross pin 9 pushes against the stirrer portion 2, whereby the conveyor tool 3 is taken along in the rotary movement.

FIGS. 2a to 2d show different views of the design of a delivery- and closure element (10) of the kind that has already been covered in the description of the prior art: FIG. 2a represents a side elevation drawing with the view directed at the delivery surface 14, while FIG. 2b shows the same delivery- and closure element rotated by −90° relative to its position in FIG. 2a, and FIGS. 2c and 2b represent three-dimensional views. The recess in the delivery portion 12 is delimited by a concave delivery surface 14, whose borders are not parallel to the plane that runs orthogonal to the central longitudinal axis but are inclined at an arbitrary angle to said plane. A recess of this kind can be produced by machining a cylindrical concavity with an angle different from 90° between the cylinder axis and the central longitudinal axis.

It is further evident from FIGS. 2a to 2d that the diameter at the delivery portion 12 is somewhat smaller than at the closure portion 11. Of course, the diameter of the outlet opening 7 of the dosage-dispensing head is matched to the closure portion 11, so that the outlet opening 7 can be closed tightly but, in the open state, leaves enough play for the rotation.

FIGS. 3a to 3c show a delivery- and closure element 100 according to the invention, in FIG. 3a seen from the side with the view directed at the delivery surface 104, in FIG. 3b in a position rotated by −90° relative to the representation of FIG. 3a, and in FIG. 3c rotated by +90° relative to the representation of FIG. 3a. Analogous to a delivery- and closure element 10 of the prior art, the delivery- and closure element 100 according to the invention has a closure portion 101 which, in cooperation with a funnel element (see FIGS. 4a and 4b), closes off a closure opening of the funnel element. Adjacent to the closure element 101 is a cylindrical delivery portion 102 whose diameter is slightly smaller than the diameter of the closure portion 101, so as to leave enough play for the rotary movement, as has already been mentioned above. The delivery portion 102 is characterized by a recess in the contour surface of the cylinder that forms the delivery portion 102.

Furthermore, the delivery- and closure element 100 of FIGS. 3a to 3c includes an integrally incorporated conveyor body 103 which, in the view of FIG. 3a, appears to the right of the central longitudinal axis and is formed as a convex outcropping from the contour surface of the cylindrical delivery portion 102. The conveyor body 103 shares a common surface with the recess of the delivery portion 102, which is advantageously configured as a smooth delivery surface 104. The delivery surface 104 forms a part of a shell surface 119 of a recess with a basically cylindrical contour shape, wherein the central lengthwise axis of said basically cylindrical contour shape defines the discharge direction AR of the delivery- and closure element 100 in which the substances in powder- or paste form leave the delivery- and closure element 100 when substance is being dispensed during operation. The discharge direction AR of the delivery surface 104 is advantageously inclined at an acute angle α relative to the end surface 105 of the delivery- and closure element 100.

The delivery surface 104 shown in FIGS. 3a to 3c (and in FIGS. 4a and 4b) is concave-curved in two directions, wherein in the second direction a second recess forms a part of a shell surface 119 of a second basically cylindrical contour shape. The central lengthwise axis 116 of the second basically cylindrical contour shape and the central lengthwise axis 115' of the delivery- and closure element 100 (which coincides with central lengthwise axis 115 of the dosage-dispensing head 1) enclose an obtuse angle β between each other. The surface configuration with two recesses has a favorable effect on the flow of the substance being dispensed.

To better illustrate the topography of the delivery surface 104, the transitions between different surface portions are represented by thinner lines. At these lines, the surface curvature changes from one surface portion to the neighboring surface portion.

The contour 108 of the conveyor body 103 shown in FIG. 3a is shaped to conform to the funnel element 106 (see FIGS. 4a and 4b). This contour can also have a different shape depending on the funnel element, such as for example a funnel shape without an intermediate cylindrical section or with at least one intermediate cylindrical section 108.

In the additional representations of the delivery- closure element 100 in FIGS. 3b and 3c, the viewing direction is rotated about the central longitudinal axis 115' to give a clearer impression of the delivery surface 104 (FIG. 3b) and of the conveyor body 103 (FIG. 3c).

FIG. 4a shows the delivery- and closure element 100 against the funnel element 106 of the dosage-dispensing head. In the illustrated position, the closure portion 101 closes off the outlet opening 107. Accordingly, this drawing represents the closed operating position.

With a translatory displacement of the delivery- and closure element 100 relative to the funnel element 106 of the dosage-dispensing head, as indicated by the arrow in FIG. 4b, the outlet opening is opened up. With a further displacement of the delivery- and closure element 100 including the conveyor body 103, the cross-sectional area of the outlet opening 107 is continuously increased, and the powdery or pasty substance can be filled in a measured amount into a container placed below the outlet opening 107.

By means of a rotary movement that is imparted to the delivery- and closure element, and which can be combined with the translatory movement, a continuous flow of the powdery or pasty substance is enhanced, as the conveyor body 103 maintains the free-flowing consistency of the substance within the funnel element 106.

What is claimed is:

1. A device for dispensing dosages of a substance in powder- or paste form, the substance provided in a supply container that is adapted for connection to a dosage-dispensing head which comprises:
   a housing with an outlet opening having a circular cross-section, the outlet opening arranged on a central longitudinal axis of the dosage-dispensing head; and
   a delivery- and closure element, also arranged on, and configured for rotation about and translatory displacement relative to the housing about, the central longitudinal axis, the delivery- and closure element having a cylindrical contour shape and comprising:
   a closure portion, for closing off the outlet opening;
   a delivery portion, adjacent to the closure portion for delivering substance that is to be dispensed, the delivery portion having a recess from a shell surface of the cylindrical contour shape of the delivery- and closure element;
   a shaft portion, adjacent to the delivery portion; and
   a conveyor body, formed on the delivery portion, for conveying substance to the outlet opening, the recess extending over both the delivery portion and the conveyor body formed thereon, providing a smoothly shaped delivery surface;
   wherein, in an operative state of the device, the closure portion is positioned below the delivery portion, forming an end surface at a bottom end of the delivery- and closure element.

2. The device of claim 1, wherein:
   the delivery surface forms a part of a shell surface of a cutout having a basically cylindrical contour shape;
   the central longitudinal axis of the shell surface of the cutout defines a discharge direction in which the substance exits from of the delivery- and closure element when in the operative state; and
   the conveyor body is arranged in the discharge direction from the central longitudinal axis of the delivery- and closure element.

3. The device of claim 2, wherein the delivery surface has a concave curvature.

4. The device of claim 2, wherein an acute angle, larger than 0° and up to 45°, is defined by the discharge direction and the end surface of the delivery- and closure element.

5. The device of claim 4, wherein the acute angle is between 15° and 25°.

6. The device of claim 1, wherein:
   the delivery surface forms a part of a shell surface of a cutout having a basically cylindrical contour shape;
   the central longitudinal axis of the shell surface of the cutout defines a discharge direction in which the substance exits from of the delivery- and closure element when in the operative state; and
   the conveyor body is arranged in a direction opposite to the discharge direction extending to the opposite side of from the central longitudinal axis of the delivery- and closure element.

7. The device of claim 6, wherein an acute angle, larger than 0° and up to 45°, is defined by the discharge direction and the end surface of the delivery- and closure element.

8. The device of claim 7, wherein the acute angle is between 15° and 25°.

9. The device of claim 6, wherein the delivery surface has a concave curvature.

10. The device of claim 1, wherein:
    the delivery surface is curved concavely in two directions, such that, in the second direction, a second recess forms a part of a shell surface of a second basically cylindrical contour shape; and
    a central longitudinal axis of the second basically cylindrical contour shape and the central lengthwise axis of the delivery- and closure element define an obtuse angle therebetween.

11. The device of claim 10, wherein the obtuse angle is more than 90° and not more than 135°.

12. The device of claim 1, further comprising:
    a funnel element of the housing at the outlet opening, located downstream of the conveyor body, relative to the movement direction of the substance when the device is in the operative state.

13. The device of claim 12, further comprising:
    a border contour of the conveyor body that follows an internal contour of the funnel element.

14. The device of claim 13, wherein:
    in the operating state of the device with the delivery- and closure element completely extended, the conveyor body is essentially always in loose contact with the internal contour of the funnel element.

15. The device of claim 13, wherein:
    in the operating state of the device with the delivery- and closure element completely extended, the conveyor body, along its border contour, is spaced apart from the internal contour of the funnel element by an interstitial gap.

16. The device of claim 13, wherein the internal contour of the funnel element is configured in the shape of a funnel with an intermediate cylindrical section.

17. The device of claim 1, wherein:
the shaft portion has a smaller diameter than the delivery portion, which, in turn, has a smaller diameter than the closure element.

18. The device of claim 1, wherein:
the conveyor body is configured as a scraper.

19. The device of claim 1, wherein the delivery surface has a concave curvature.

\* \* \* \* \*